United States Patent
Zhang et al.

(10) Patent No.: US 11,333,517 B1
(45) Date of Patent: May 17, 2022

(54) DISTRIBUTED COLLECTION AND VERIFICATION OF MAP INFORMATION

(71) Applicants: Weiyu Zhang, Sunnyvale, CA (US); Xufeng Han, Cupertino, CA (US); Lukas M. Marti, San Jose, CA (US); Ross W. Anderson, San Francisco, CA (US); Kjell Fredrik Larsson, San Jose, CA (US)

(72) Inventors: Weiyu Zhang, Sunnyvale, CA (US); Xufeng Han, Cupertino, CA (US); Lukas M. Marti, San Jose, CA (US); Ross W. Anderson, San Francisco, CA (US); Kjell Fredrik Larsson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/222,351

(22) Filed: Apr. 5, 2021

Related U.S. Application Data

(63) Continuation of application No. 16/361,278, filed on Mar. 22, 2019, now Pat. No. 10,969,237.

(60) Provisional application No. 62/647,219, filed on Mar. 23, 2018.

(51) Int. Cl.
| | | |
|---|---|---|
| *G01C 21/36* | (2006.01) | |
| *G06T 7/70* | (2017.01) | |
| *G06K 9/62* | (2022.01) | |
| *G06V 20/56* | (2022.01) | |

(52) U.S. Cl.
CPC ....... *G01C 21/3602* (2013.01); *G06K 9/6267* (2013.01); *G06T 7/70* (2017.01); *G06V 20/56* (2022.01); *G06T 2207/30244* (2013.01); *G06T 2207/30252* (2013.01)

(58) Field of Classification Search
CPC .. G01C 21/3644; G01C 21/30; G01C 21/005; G06K 9/00798; G06K 9/00818; G06K 9/00791; G06K 9/00825; G06K 9/3258; G06K 9/00805; G06K 9/00201; G06K 9/00369; G05D 1/0246; G05D 1/0251
See application file for complete search history.

(56) References Cited

U.S. PATENT DOCUMENTS

| | | | |
|---|---|---|---|
| 8,284,995 B2 | 10/2012 | Diaz et al. | |
| 9,429,438 B2 | 8/2016 | Weng et al. | |
| 9,547,984 B2 | 1/2017 | Gueziec et al. | |
| 9,643,605 B2 | 5/2017 | Pawlicki et al. | |
| 9,792,368 B1 * | 10/2017 | Amacker | H04W 4/02 |
| 10,218,941 B1 * | 2/2019 | Park | H04W 4/50 |

(Continued)

FOREIGN PATENT DOCUMENTS

| | | | | |
|---|---|---|---|---|
| JP | 2017146711 A | * | 8/2017 | B60R 1/00 |

*Primary Examiner* — Dung Hong
(74) *Attorney, Agent, or Firm* — Young Basile Hanlon & MacFarlane, P.C.

(57) ABSTRACT

A method includes capturing images at a device and analyzing the images at the device using a first analysis model to obtain information regarding an observed object that corresponds to a predetermined object. The method also includes determining whether the information regarding the observed object is consistent with stored mapping information, and, in response to determining that the information regarding the observed object is not consistent with the stored mapping information, modifying the stored mapping information based on the observed object.

22 Claims, 9 Drawing Sheets

(56) References Cited

U.S. PATENT DOCUMENTS

| | | | |
|---|---|---|---|
| 2007/0088497 A1* | 4/2007 | Jung | G01C 21/3647 348/113 |
| 2008/0240513 A1* | 10/2008 | Xie | G06V 20/10 382/209 |
| 2009/0140887 A1* | 6/2009 | Breed | G01S 17/86 701/116 |
| 2009/0214082 A1* | 8/2009 | Hoshi | H04N 1/32128 382/106 |
| 2009/0312943 A1 | 12/2009 | Kelly et al. | |
| 2011/0246027 A1* | 10/2011 | Miyajima | G06K 9/00 707/E17.022 |
| 2012/0062741 A1 | 3/2012 | Stimel, Jr. et al. | |
| 2012/0135745 A1* | 5/2012 | Kaplan | G01C 21/32 455/456.1 |
| 2012/0166074 A1* | 6/2012 | Weng | G01C 21/3811 707/792 |
| 2012/0316780 A1* | 12/2012 | Huth | G09B 29/10 701/450 |
| 2014/0111647 A1 | 4/2014 | Atsmon et al. | |
| 2014/0335897 A1 | 11/2014 | Clem et al. | |
| 2014/0347492 A1* | 11/2014 | Fales | G01C 11/06 348/164 |
| 2015/0145991 A1 | 5/2015 | Russell et al. | |
| 2015/0269438 A1 | 9/2015 | Samarasekera et al. | |
| 2016/0234652 A1* | 8/2016 | Chao | H04W 4/021 |
| 2016/0378868 A1 | 12/2016 | Har-Noy et al. | |
| 2017/0052036 A1 | 2/2017 | Uno | |
| 2017/0174129 A1* | 6/2017 | Chin | B60W 40/08 |
| 2017/0184409 A1 | 6/2017 | Glasgow et al. | |
| 2017/0184411 A1 | 6/2017 | Glasgow et al. | |
| 2017/0186315 A1 | 6/2017 | Glasgow et al. | |
| 2017/0314954 A1 | 11/2017 | Golding et al. | |
| 2017/0336221 A1 | 11/2017 | Salowitz et al. | |
| 2018/0047288 A1 | 2/2018 | Cordell et al. | |
| 2018/0293466 A1* | 10/2018 | Viswanathan | G06V 20/56 |
| 2018/0306590 A1* | 10/2018 | Li | G06F 16/29 |
| 2019/0041228 A1 | 2/2019 | Singhal | |
| 2019/0049264 A1 | 2/2019 | Malkes et al. | |
| 2019/0120654 A1 | 4/2019 | Todasco et al. | |
| 2019/0187723 A1 | 6/2019 | Tao et al. | |
| 2019/0370609 A1* | 12/2019 | Akiyama | G06V 10/82 |
| 2020/0098135 A1* | 3/2020 | Ganjineh | G06T 7/74 |
| 2020/0195844 A1 | 6/2020 | Kim et al. | |

\* cited by examiner

DISTRIBUTED COLLECTION AND VERIFICATION OF MAP INFORMATION

CROSS-REFERENCE TO RELATED APPLICATION

This application is a continuation of U.S. patent application Ser. No. 16/361,278, filed on Mar. 22, 2019, which claims the benefit of U.S. Provisional Application No. 62/647,219, filed on Mar. 23, 2018. The contents of the foregoing application are incorporated herein by reference in their entireties for all purposes.

TECHNICAL FIELD

The application relates generally to the field of digital maps.

BACKGROUND

Digital maps serve many of the same functions as traditional paper maps, but are able to be stored and viewed using computing devices, such as personal computers or smartphones. Digital maps are comprised of mapping information that is stored in a computer-interpretable format. Features included in digital maps can include geographical features, topographical features, political boundaries, attractions, and transportation networks, as might be found on paper maps. Transportation network features that can be displayed on maps include roadways, transit routes, walking paths, and biking paths. Digital maps may also be annotated with other types of information, such as descriptions or photographs that relate to specific locations.

Digital maps are created using various methods, and on-site data collection may be necessary to obtain high quality information. After a digital map is created, the features that it describes may change over time, and the digital map can be modified to reflect these changes.

SUMMARY

One aspect of the disclosed embodiments is a method that includes capturing images at a device and analyzing the images at the device using a first analysis model to determine whether the images include an observed object that corresponds to a predetermined object. The method also includes determining whether the information regarding the observed object is consistent with stored mapping information, and, in response to determining that the information regarding the observed object is not consistent with the stored mapping information, modifying the stored mapping information based on the observed object.

In some implementations of the method, modifying the stored mapping information based on the observed object includes updating the stored mapping information to include on the information regarding the observed object. In some implementations of the method, modifying the stored mapping information based on the observed object includes updating the stored mapping information to include information indicating an inconsistency in the stored mapping information.

In some implementations of the method, the information indicating the inconsistency is used to determine whether to collect additional information in an area. In some implementations of the method, determining whether the information regarding the observed object is consistent with stored mapping information includes estimating a camera position and pose for a camera that is associated with the device, and estimating a location of the observed object relative to the camera. In some implementations of the method, determining whether the information regarding the observed object is consistent with stored mapping information includes determining whether a location for the observed object is consistent with the stored mapping information. In some implementations of the method, determining whether the information regarding the observed object is consistent with stored mapping information includes determining whether metadata associated with the observed object is consistent with the stored mapping information.

In some implementations of the method, the method includes transmitting the information regarding the observed object to a mapping system, wherein transmitting the information regarding the observed object to the mapping system includes defining an image portion that depicts the observed object. In some implementations of the method, the method includes transmitting information regarding the observed object to a mapping system, wherein determining whether the information regarding the observed object is consistent with stored mapping information is performed at the mapping system using a second analysis model, and analyzing the information regarding the observed object at a mapping system to determine a classification for the observed object.

The method may include determining a speed for the device and determining a capture interval based on the speed, wherein capturing images at the device is performed according to the capture interval. The method may further include overriding the capture interval in response to a command from the mapping system. Overriding the capture interval in response to the command from the mapping system may be performed in response to determining that the device is located in a predetermined area.

In some implementations of the method, the first analysis model is selected from a group of two or more analysis models based on a location of the device.

Another aspect of the disclosed embodiments is a method that includes capturing an image at a device, and determining, by the device using a first analysis model, that the image includes an observed object. In response to determining the image includes the observed object, the method includes transmitting at least an image portion from the image to a mapping system, and determining, by the mapping system using a second analysis model, a classification for the observed object.

The method may include determining, by the mapping system, whether the observed object is consistent with stored mapping data. In some implementations of the method, in response to determining that the observed object is not consistent with the stored mapping data, the method includes requesting, by the mapping system, a full-frame version of the image. The method may also include updating, by the mapping system, the stored mapping data based on the observed object.

Another aspect of the disclosed embodiments includes receiving, by a mapping system from a device, a navigation request. The method also includes identifying, by the mapping system, potential routes in response to the navigation request, selecting a navigation route from the potential routes based in part on a need to update mapping information along one or more of the potential routes, and transmitting the navigation route to the device.

In some implementations of the method, the device captures mapping information while following the navigation route. The method may include determining a score indicative of the need for an update for each of the potential routes, wherein selecting the navigation route is performed based in part on the score for each of the potential routes.

DETAILED DESCRIPTION

The disclosure herein is directed to obtaining mapping information from a number of different devices that send information from specific locations to a mapping system. At each device, the information is analyzed, for example, to recognize and classify objects of interest that are present in images obtained by the devices. The devices can send portions of the information that they collect to the mapping system, such as image portions that depict the objects of interest and metadata that describes the objects of interest, as determined by the device-side analysis. The information that is obtained by the devices can be analyzed to determine whether modifications should be made to a map or to a mapping-dependent system. This analysis can be performed at the devices or at the mapping system. In implementations in which the determination as to whether modifications should be made to the mapping information, the result of the determination is transmitted to the mapping system to indicate, for example, either that the mapping information maintained by the mapping system is correct, or to describe an update to be made to the mapping information that is maintained by the mapping system.

Figure 1:
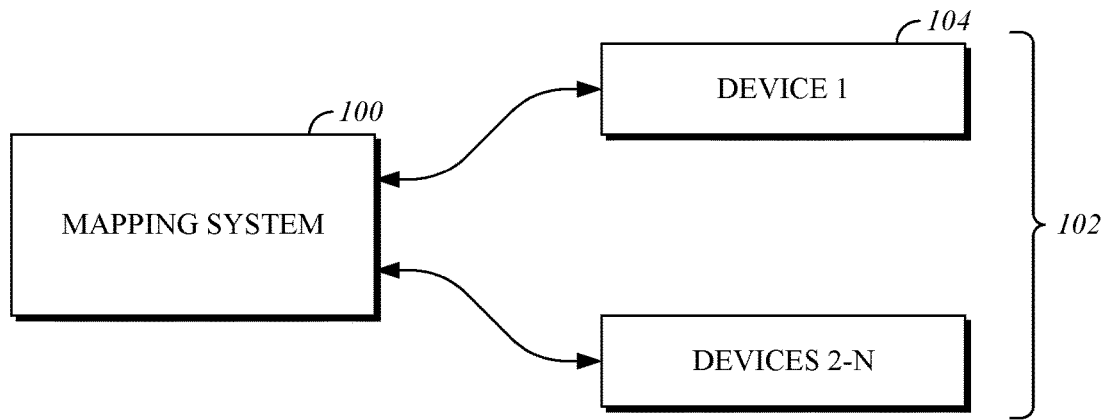
FIG. 1 is a block diagram that shows a mapping system and a group of distributed devices.

FIG. 1 is a block diagram that shows a mapping system 100 and a group of distributed devices 102. The mapping system 100 stores, receives, maintains, analyzes, receives, and provides mapping information. As used herein, the term "mapping information" describes information that describes features that are incorporated in a map or can be incorporated in a map, whether in a structured form or an unstructured form. The mapping system 100 may be implemented, in part, using one or more computing devices. As an example, suitable computing devices for use in implementing the mapping system 100 can include a memory, a processor, and program instructions that are stored in the memory and cause the processor to perform actions when executed. The mapping system 100 can be implemented using a single computing device or using multiple computing devices that communicate by sending and receiving information using wired or wireless communications systems.

In addition to receiving and utilizing mapping information that is received from the mapping system 100, each of the distributed devices 102 is configured to obtain, analyze, and transmit information to the mapping system 100 to describe conditions in the physical environment that are observed by the distributed devices 102. The distributed devices 102 includes a device 104 (also referred to as a "first device" or "device 1") and additional devices (also referred to as "devices 2-$n$" where n represents the total number of devices). The total number of devices in the distributed devices 102 can be large (e.g., thousands of devices).

Each device of distributed devices 102 is in communication with the mapping system 100. As will be explained herein the mapping system 100 is able to send information to each of the distributed devices 102, including mapping information such as a map and annotations, navigation information, and commands. The mapping system 100 is able to receive information from each of the distributed devices 102. For example, the mapping system 100 can receive images and associated metadata that are transmitted from the distributed devices 102.

Figure 2:
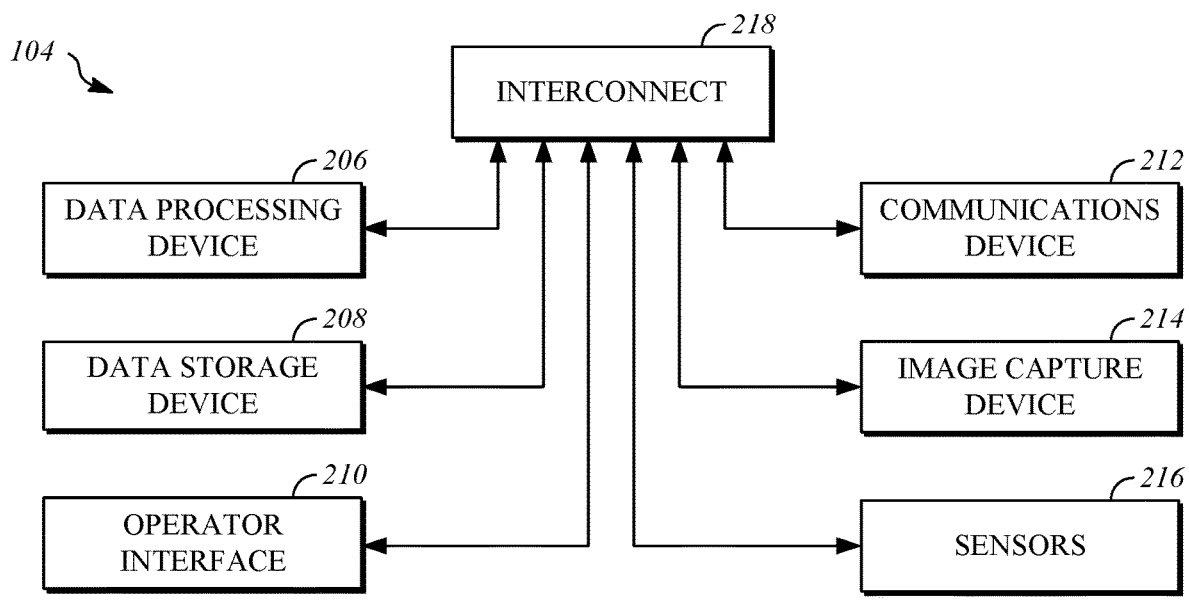
FIG. 2 is a block diagram that shows an example hardware configuration for a device from the distributed devices.

FIG. 2 is a block diagram that shows an example hardware configuration for the device 104, which can be used to implement some or all of the distributed devices 102. The hardware configuration includes a data processing device 206, a data storage device 208, an operator interface 210, a communications device 212, an image capture device such as a camera 214, sensors 216, and an interconnect 218. The data processing device 206 is operable to execute instructions that have been stored in the data storage device 208. In some implementations, the data processing device 206 is a processor with random access memory for temporarily storing instructions read from the data storage device 208 while the instructions are being executed.

The data storage device 208 may be a non-volatile information storage device such as a hard drive or flash memory. In addition to storing program instructions that are executable by the data processing device 206, the data storage device 208 can be used to store additional information. For example, the data storage device 208 can store images and metadata collected by the device 104, for later transmission to the mapping system 100. In some implementations, a ring buffer is implemented using the data storage device 208, in order to temporarily store obtained information until it is transmitted to the mapping system 100, and subsequently overwriting that information in order to store newly obtained information such as images and metadata.

The operator interface 210 facilitates communication with a user of the device 104 and may include any type of human-machine interface such as buttons, switches, a touchscreen input device, a gestural input device, an audio input device, a display, and/or a speaker. The communications device 212 allows input and output of information to other systems, such as through a wireless communications link. Examples of wireless communications technologies that can be utilized include cellular data technologies and IEEE 802.11 based communications technologies.

The camera 214 is operable to output images representing a portion of the environment near the device 104. The camera 214 may be a digital still camera or a digital image camera that outputs information that defines the content of an image or a series of images (e.g., video frames). The camera 214 incorporates a digital image sensor, with suitable types of image sensors including charge-coupled device (CCD) based image sensors and complementary metal-oxide-semiconductor (CMOS) based image sensors. The images that are captured by the camera 214 can be analyzed by the device 104 and/or transmitted from the device 104 to the mapping system 100.

The sensors 216 are operable to obtain, store, and/or transmit information (e.g., metadata) that is associated (e.g., temporally associated) with the images that are obtained by the camera 214. Information output by the sensors 216 can include position, heading, velocity, linear acceleration, and rotational acceleration. Examples of individual sensors that can be included in the sensors 216 include a satellite positioning system senor and an inertial measurement unit (e.g., incorporating a three-axis accelerometer, a three-axis gyroscope, and a three-axis magnetometer).

The interconnect 218 facilitates communication between the various components of the device 104. As an example, the interconnect 218 may be a system bus or may include multiple system buses.

Figure 3:
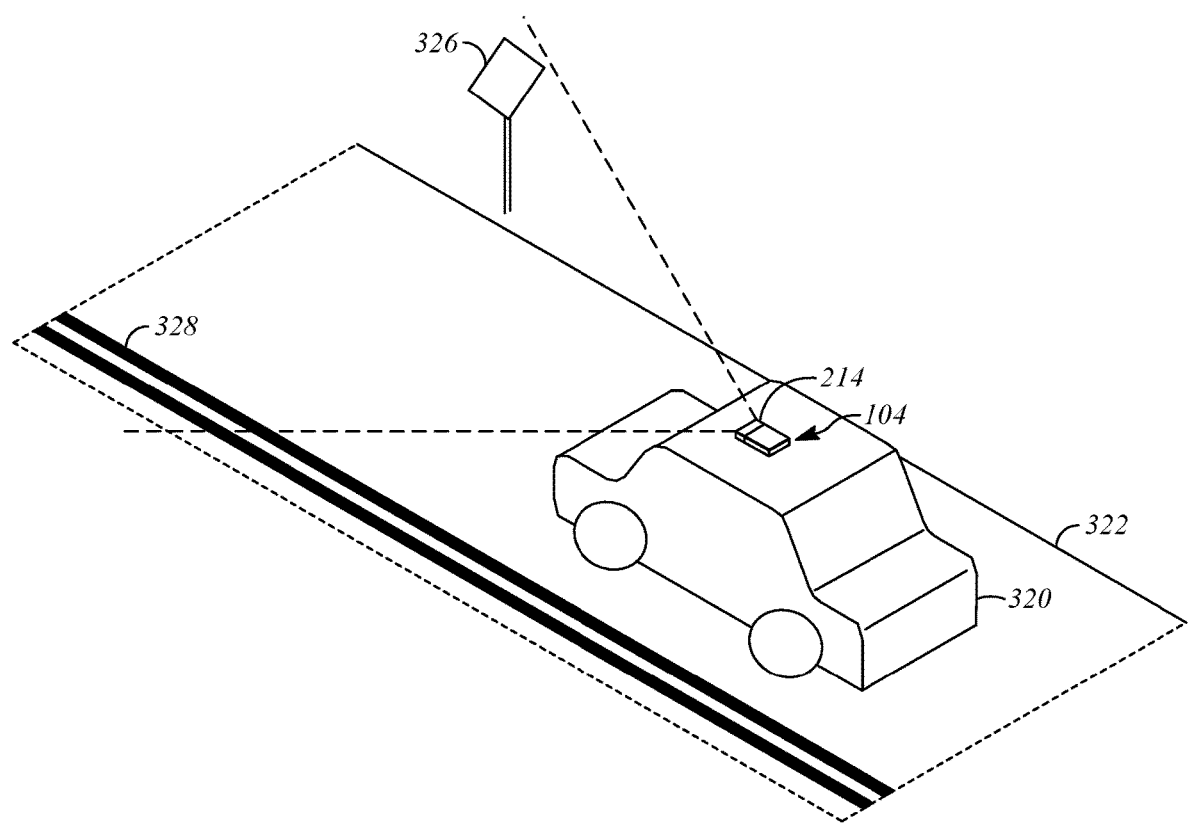
FIG. 3 is an illustration showing a vehicle that is travelling along a road.

FIG. 3 is an illustration showing a vehicle 320 that is travelling a road 322. The vehicle 320 is carrying the device 104, and the device 104 is mounted with respect to the vehicle 320 such that a portion of the road 322, for example, a length of the road 322 ahead of the vehicle 320, is located within a field of view of 324 of the camera 214.

Along the road 322, there are objects and features, such as a traffic sign 326 (e.g., a regulatory, warning, or informational sign), lane marking lines 328, temporary traffic control devices (e.g., indicating the presence of a work zone or a temporary lane closure), and traffic control signals. These objects and features may be within the field of view of the camera 214. The camera 214 may obtain one or more images that depict the objects or features, such as the traffic sign 326. At the time that the images are obtained by the camera 214, the device 104 can also obtain metadata, such as information from the sensors 216.

In some implementations, the device 102 makes decisions regarding whether to obtain images and metadata, and how often to do so. These decisions can be made using explicit conditions and criteria, using a trained machine learning algorithm, or using a combination of these and/or other techniques. Information that can be used to determine whether and how often to obtain images and metadata can include the speed of the vehicle 320, the temperature of the device 104, motion of the vehicle 320 (e.g., stop obtaining images beyond certain acceleration thresholds), lighting conditions, and weather conditions. In an implementation utilizing a machine learning model, some or all of these conditions can be used as input signals to train the machine learning model, and combined with ground truth information indicating whether a usable result (e.g., an image that includes an identifiable object) was obtained under the conditions.

After capturing and analyzing one or more of the images that were captured by the camera 214, the device 104 transmits information to the mapping system 100. The information transmitted to the mapping system 100 from the device 104 may include one or more of the images, an image portion from one or more of the images (e.g., by cropping), and/or metadata associated with one or more of the images or image portions.

In FIG. 3, the device 104 is illustrated as being located on and connected to the vehicle 320. However, the device 104 can be embodied in a number of different implementations, and can be located and mounted with respect to the vehicle 320 is a number of different ways. As one example, the device 104 can be a smartphone, and the components of the device 104, as described with respect to FIG. 2, can be components that are included in the smartphone (i.e., as an integral device). In implementations in which the device 104 is a smartphone, it can be mounted in the vehicle 320 by conventional means such as a support structure that is connected to the windshield, dashboard, or other interior component of the vehicle 320 by suction, adhesives, or other structures. As another example, the device 104 can be implemented using a number of discrete components that are connected together.

Figure 4:
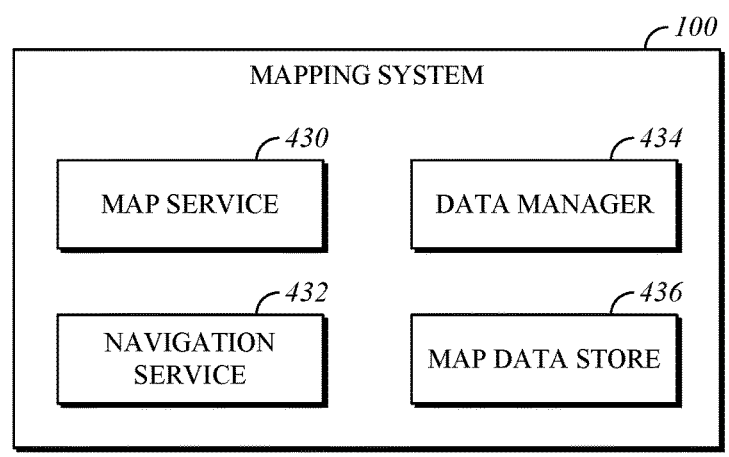
FIG. 4 is a block diagram that shows the mapping system.

FIG. 4 is a block diagram that shows the mapping system 100. The mapping system 100 is located remotely from the distributed devices 102, and sends information to and receives information from the distributed devices by transmission of data over a computer network (e.g., the Internet). The mapping system 100 includes a map service 430, a navigation service 432, a data manager 434, and a map data store 436.

The map service 430 receives requests for map information, such as from the distributed devices 102 or other devices. In response to the requests, the map service 430 obtains the requested map information from the map data store 436, and transmits the map information in a form that can be used to cause display of a map in graphical form and/or other mapping information such as annotations.

The navigation service 432 is operable to determine a route. For example, the navigation service 432 can receive a request for a route, such as from the device 104. The request can specify a starting point, such as a current location of the device 104, and an ending point that represents a destination for the device 104 or an intermediate location along a longer route for the device 104.

The data manager 434 maintains and updates the mapping information that is stored by the map data store 436. As will be explained further herein, one example of a function that may be performed by the data manager 434 include identifying inconsistencies between mapping information in the map data store 436 and information received from the distributed devices 102. Another example of a function that may be performed by the data manager 434 is determining whether the mapping information in the map data store 436 should be modified in response to receiving information from the distributed devices 102. Another example of a function that may be performed by the data manager 434 is identifying an area where additional information should be collected in order to the update the information in the map data store 436.

Figure 5:
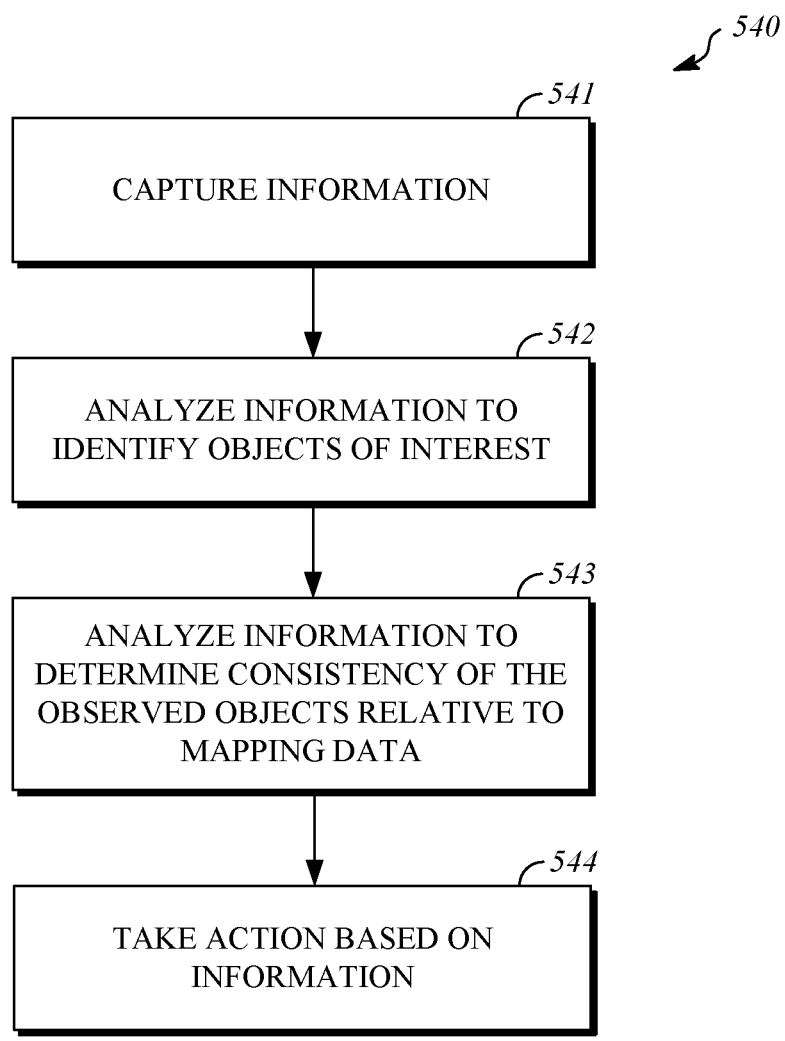
FIG. 5 is a flowchart that shows an example of a process for distributed collection and verification of map information.

FIG. 5 is a flowchart that shows an example of a process 540 for distributed collection and verification of map information. The process 540 can be performed using the distributed devices 102 and, optionally, using the mapping system 100, with the description herein being made with respect to the device 104. The process 540 can, however, be implemented using other configurations.

The operations of the process 540, and other processes described herein, can be caused, controlled, or performed by one or more computing devices, such as computing devices that are associated with the distributed devices 102 and, optionally, with the mapping system 100. In some implementations, the computing devices are provided with instructions that are stored in a storage device or a memory device, and a processor that is operable to execute the program instructions, where the instructions, when executed, cause some or all of the operations to be performed by the computing devices. In some implementations, some or all of the operations are performed using special-purpose hardware, such as a custom microcontroller, an application-specification integrated circuit (ASIC), or a field-programmable gate array (FPGA).

Operation 541 includes capturing information, and can be performed by the device 104. The device 104 may be located in a mobile apparatus such as the vehicle 320. The information captured in operation 541 can include an image that is obtained, for example, by the camera 214 of the device 104. The information captured in operation 541 can also include metadata. The metadata is captured at or around the time that the image is captured. The metadata can be information that is obtained from any source that is associated with the device 104, such as the sensors 216. As one example, the metadata can include the time (e.g., a timestamp) at which the image was captured. As another example, the metadata can include a position of the device 104 at the time the image was captured, such as a position obtained using a satellite positioning system and expressed using a coordinate system (e.g., latitude and longitude). As additional example, the metadata can include information describing the heading, angular orientation, linear and angular velocity, and linear and angular acceleration of the device 104. Additional types of information may also be included in the metadata.

Operation 542 includes analyzing the information that was obtained in operation 541 at the device 104 to identify objects of interest. As will be explained further herein, operation 542 can include determining, based on the content of the image, whether the image or portions of it should be analyzed further by the device 104 or by the mapping system 100. Operation 542 may be performed, in part, using a device-side analysis model, which may be a trained machine learning model. The device side analysis model can be configured to detect to presence and location of objects of interest in images obtained in operation 541, and may optionally identify the type of the object (e.g., by classifying the object). In some implementations, operation 542 can include transmitting the image or portions of it and associated metadata to the mapping system 100, or taking no action if it is determined that the image should not be analyzed further.

Operation 543 includes analyzing information obtained in operation 542 to determine consistency of the observed objects relative to mapping data. Operation 543 can include determining the locations of objects observed by the device 104 in terms of map coordinates in order to allow comparisons of the positions of observed objects with the positions of objects that are included in the mapping information that is included in the map data store 436, by estimating the positions of the objects relative to the optical center of the camera 214 of the device 104 using a trained machine learning model, geometric construction, or other methods. Operation 543 can also include comparing information received from the device 104 with mapping information from the map data store 436 and determining whether the received information is consistent with the mapping information from the map data store 436 or inconsistent with the mapping information from the map data store 436. As will be explained herein, operation 543 can also include determining whether to take action in response to the information received from the device 104 (and optionally other devices from the distributed devices 102).

In some implementations, operation 543 is performed at the device 104. In other implementations, operation 543 is performed by the mapping system 100 using information received from the device 104. In implementations in which operation 543 is performed at the mapping system 100, operation 543 may be performed, in part, using a system-side analysis model, which may be a trained machine learning model. The system-side analysis model can be configured to detect to presence, location, and types of objects of interest in images obtained in operation 541. In some implementations, the device-side analysis model and the system-side analysis model are machine learning models that are trained using the same training data. In some implementations, the device-side analysis model and the system-side analysis model are machine learning models and the device-side analysis model is an optimized version of the system-side analysis model, including optimizations made using known techniques to simplify and compress the model for better performance on the device 104.

Operation 544 includes taking one or more actions in response to the information determined in operation 543, and is an optional step. Specific actions and determinations regarding whether to take them will be described further herein. For example, a determination as to whether or not to take actions can be performed based on the analysis performed in operation 543. Operation 544 may be performed at the device 104 or at the mapping system 100. In implementations in which operation 544 is performed at the device 104, results may be transmitted to the mapping system 544 in order to update information stored at the mapping system 544. In some implementations, actions are taken at the mapping system 100 in operation 544 based on analysis of information from a number of separate observations received from the device 104 or from a number of the distributed devices 102.

It should be understood that the process 540 can be extended and/or modified to activate and deactivate image capture and/or control image capture rate based on different or additional criteria. As one example, the temperature of the device 104 can be monitored and image capture deactivated when the temperature is above a threshold temperature. As another example, image capture can be deactivated when linear or rotational acceleration exceeds a threshold beyond which sufficient quality images are not likely to be captured.

Figure 6:
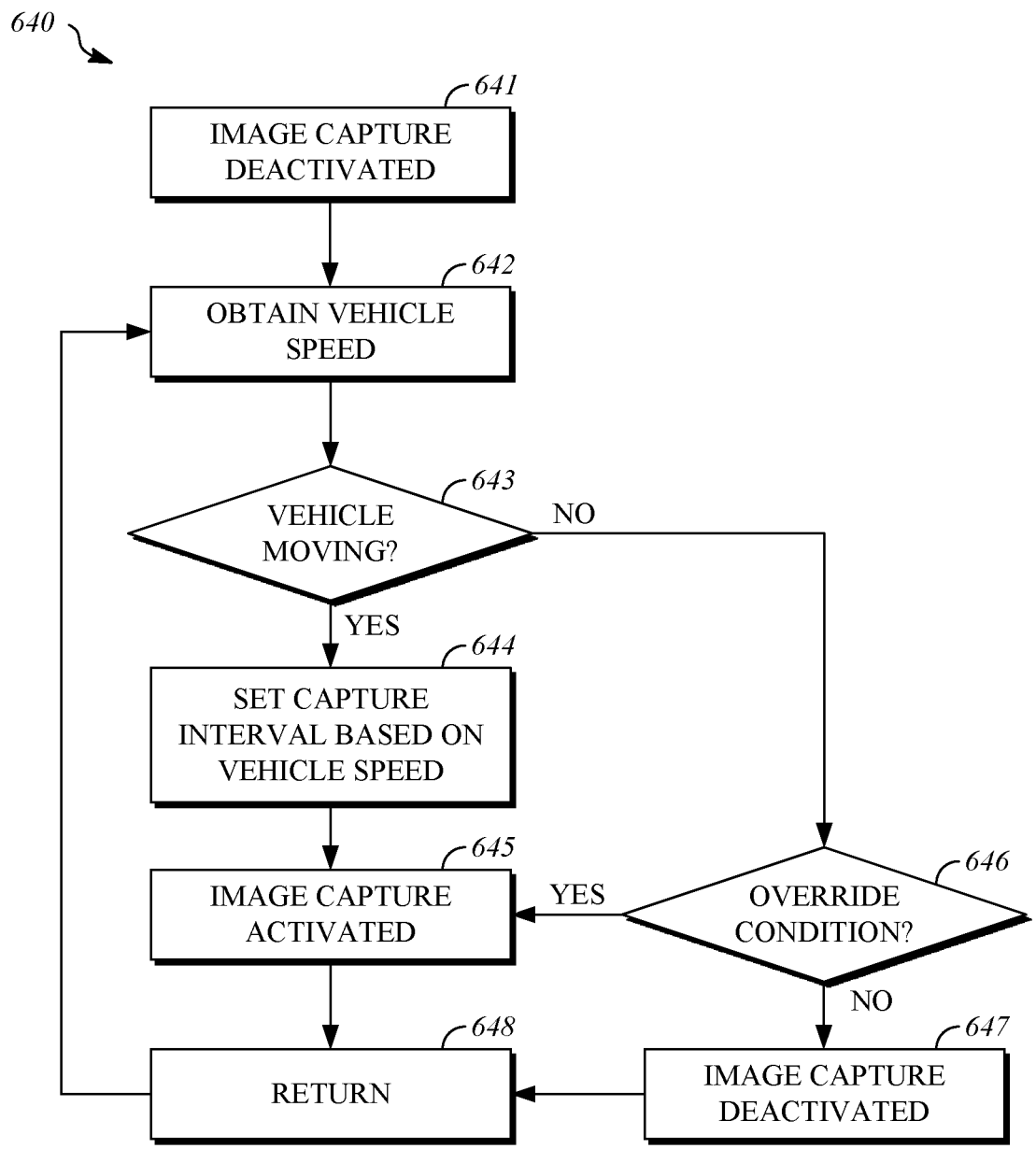
FIG. 6 is a flowchart that shows an example of a process for distributed collection and verification of map information.

FIG. 6 is a flowchart that shows an example of a process 640 for distributed collection and verification of map information. The process 640 can be performed using the distributed devices 102 and, optionally, the mapping system 100, with the description herein being made with respect to the device 104 being located in the vehicle 320. The process 640 can, however, be implemented using other configurations. The process 640 can, for example, be included in the process 540.

Initially, in operation 641, image capture is deactivated at the device 104. In operation 642, the speed of the vehicle 320 is obtained. As an example, the vehicle speed can be inferred based on the speed of the device 104, as detected by the sensors 216, such as by calculating velocity using position changes detected by a satellite positioning system that is included in the sensors 216.

In operation 643, a determination is made as to whether the vehicle 320 is moving. The vehicle 320 can be judged as not moving if the speed of the vehicle 320 is below a threshold value (e.g., 3 miles per hour). If it is determined that the vehicle 320 is moving, the process 640 proceeds to operation 644. If it is determined that the vehicle 320 is not moving, the process 640 proceeds to operation 646.

In operation 644, a capture interval is set for obtaining information (e.g., images and metadata) by the device 104. Thus, for example, at a one second capture interval, an image is obtained by the camera 214 and associated metadata from the sensors 216 and/or other sources is recorded once per second. In one implementation, for all speeds that are determined to correspond to movement of the vehicle 320, the capture interval is set to a single predetermined value, such as once per second. In another implementation, multiple possible capture intervals are defined, each corresponding to a range of speeds. In another implementation, the capture interval is determined according to a mathematical relationship based on the vehicle speed. For example, the mathematical relationship could enforce a consistent spacing, in terms of distance travelled by the vehicle 320, between captured images. In operation 645, image capture is activated using the capture interval determined in operation 644. Alternatively, if image capture was previously active and the capture interval has changed, image capture continues using the new capture interval determined in operation 644.

In operation 646, subsequent to determining that the vehicle 320 is not moving a determination is made as to whether an override condition exists. The override condition allows images to be captured regardless of the fact that the vehicle is not moving, and can be used in situations where the camera 214 is able to obtain images of a dynamic condition.

Examples of conditions that may trigger an override at operation 646 include ability to observe the current state of a traffic signal, ability to observe presence and motion of other nearby vehicles, and ability to observe presence and behavior of pedestrians. As one example, the device determines that the override condition exists based on a command received from the mapping system 100. The mapping system 100 can, for example, identify a location (e.g., by a geofenced area or in terms of distance from a point) and specify that images should be captured in that area regardless of vehicle speed, which represents an override condition for the purposes of operation 646. As another example, the device 104 determines whether the override condition exists for a given location based on subject matter present in an image captured by the device 104. The subject matter that triggers the device 104 to determine that the override condition exits can be specified, for example, by a list of subjects, which may be previously provided to the device 104 or may be received by the device 104 in a command from the mapping system 100. In response to determining that the override condition exists, the process 640 continues to operation 645. In response to determining that the override condition does not exist, the process 640 advances to operation 647, where image capture is deactivated if it was previously active, or remains deactivated if it was not previously active.

Subsequent to operation 645 or operation 647, the process proceeds to operation 648, in which the flow of the process is returned to operation 642 and additional iterations of the process 640 are performed. In some implementations, operation 648 delays commencement of an addition iteration of the process 640 until a condition is met, such as the passage of a predetermined length of time.

Figure 7:
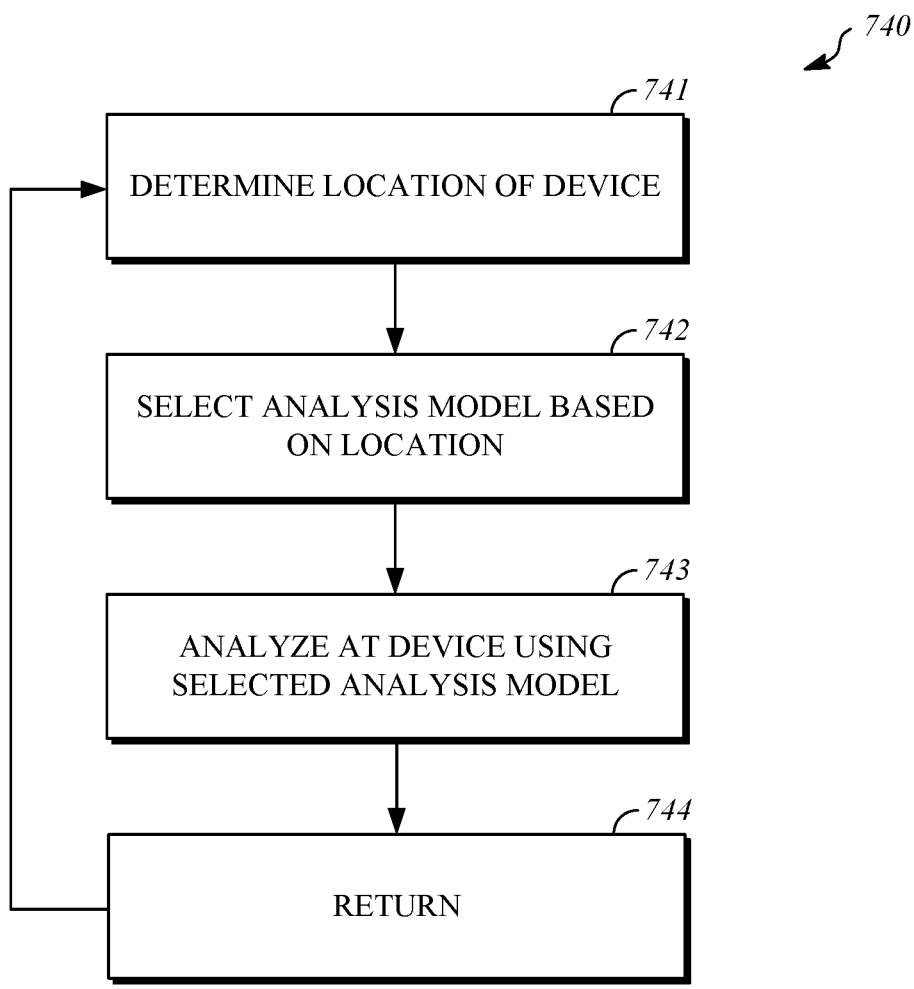
FIG. 7 is a flowchart that shows an example of a process for analysis model selection.

FIG. 7 is a flowchart that shows an example of a process 740 for analysis model selection. The process 740 can be performed using the distributed devices 102 and, optionally, the mapping system 100, with the description herein being made with respect to the device 104 being located in the vehicle 320. The process 740 can, however, be implemented using other configurations. The process 740 can, for example, be included in the process 540.

In operation 741, the location of the device 104 is determined. For example, the location of the device 104 can be determined using signals received from the sensors 216 (e.g., from a satellite positioning system). In operation 742, an analysis model is selected based on the location of the device 104, as determined in operation 741. The multiple geographic regions can be defined by geofencing, based on political boundaries, or using other suitable methods. Each of the geographic regions is associated with an analysis model. In one implementations, the analysis models are trained machine learning models. As an example, the machine learning models can be convolutional deep neural networks. Each machine learning model is trained using ground truth information that corresponds to the objects that are expected to be encountered in a corresponding one of the geographic regions. As an example, a first analysis model may correspond to a first geographic region (e.g., a country, state, county, or arbitrarily defined region), and a second analysis model may correspond to a second geographic region (e.g., a country, state, county, or arbitrarily defined region), where the first analysis model and the second analysis model are different trained machine learning models that were trained using different training data sets.

In operation 743, analysis is performed by the device 104 using the analysis model that was selected in operation 742. As explained herein, the analysis performed in operation 743 may include identifying one or more objects in an image that was captured by the device 104 using the camera 214.

In operation 744, the flow of the process is returned to operation 741 and additional iterations of the process 740 are performed. This allows the device 104 to periodically determine whether the position of the device 104 has changed such that analysis model being used by the device should be changed. In some implementations, operation 744 delays commencement of an addition iteration of the process 740 until a condition is met, such as the passage of a predetermined length of time.

Figure 8:
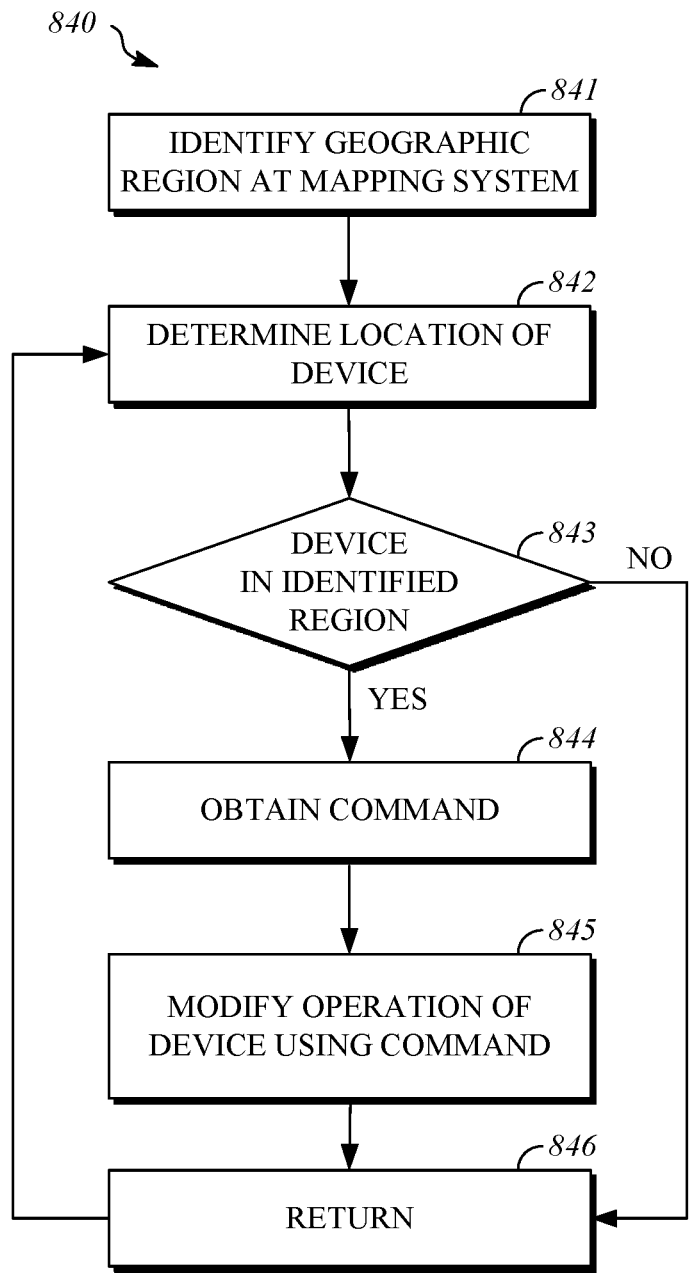
FIG. 8 is a flowchart that shows an example of a process for modification of image capture parameters.

FIG. 8 is a flowchart that shows an example of a process 840 for modification of image capture parameters. The process 840 can be performed using the mapping system 100 and the distributed devices 102, with the description herein being made with respect to the device 104 being located in the vehicle 320. The process 840 can, however, be implemented using other configurations. The process 840 can, for example, be included in the process 540.

In operation 841, a geographic region is identified at the mapping system 100. The geographic region can be identified by the mapping system 100 based on a determination that additional observations are needed within the geographic region in order to verify and/or update the mapping information in the map data store 436 of the mapping system 100.

As one example, the mapping system 100 can identify the region based on receiving information from the distributed devices 102 or other sources that is indicative of changed conditions in the geographic regions. The changed conditions can include removal and/or installation of one or more traffic control devices, such as signs, lane markings, or temporary traffic control devices for a work zone.

In a further example, the mapping system can track inconsistencies between information received from the distributed devices and objects represented in the mapping information from the map data store. Each of the inconsistencies can be characterized, such as by assigning them to a category or assigning them a numerical score. These records can be compared to criteria to determine whether to define a geographic region in which additional observations will be requested. As one example, a geographic region can be defined when the number of inconsistencies in a certain category exceeds a threshold. In another example, a geographic region can be defined when the numerical score in an area exceeds a threshold. As another example, existence of a single inconsistency in a certain category may trigger definition of a geographic area for requesting further observations, such as a perceived change in the traffic control type for an intersection (e.g., from stop-controlled to traffic signal-controlled). As another example, an inconsistency can be used to immediately change mapping information and/or change operation of the navigation service 432, such as when a previously unknown lane closure is observed (e.g., in a work zone).

In operation 842, the location of the device 104 is determined. For example, the location of the device 104 can be determined using signals received from the sensors 216 (e.g., from a satellite positioning system). In operation 843, a determination is made as to whether the device 104 is located within the region that was identified in operation 841. For example, each geographic region can be modelled as a geofenced area, and the determination in operation 844 can be performed by comparing the location of the device 104 to the geofenced areas. The determination made in operation 843 can be made either by the mapping system 100 in response to receiving information from the device 104 indicating its location, or by the device 104 if information defining the geographic regions has previously been received at the device 104.

In operation 844, a command is obtained for use by the device 104. The command can instruct the device to utilize specific settings, parameters, modes of operation or other parameters that may modify operation of the device 104 or a portion of it relative to its existing operational state. In some implementation, the command is obtained by transmitting the command from the mapping system 100 to the device 104 in response to determining that the device 104 is located within one of the geographic regions. In other implementations, the command is received prior to the determination made in operation 843, and is associated with a definition of the geographic area as defined in operation 841, so that the device 104 can access the command (e.g., from the data storage device 208 of the device 104) upon determining that the respective geographic region has been entered.

In operation 845, operation of the device 104 is modified using the command that was obtained in operation 844. The command can cause the device 104 to transmit additional information to the mapping system 100. Examples of transmitting additional information to the mapping system include transmitting full frame images to the mapping system 100 as opposed to sending cropped image portions representative of objects (e.g., where the mapping system 100 has limited or obscured imagery of a location), transmitting images at higher bitrates (i.e., at a higher spatial resolution and/or at a lower compression rate), and decreasing the capture interval (e.g., to observe and determine traffic signal timings). Thus, using the command from the mapping system 100, the device 104 can automatically configure itself to perform location-specific tasks.

In operation 846, the flow of the process is returned to operation 841 and additional iterations of the process 840 are performed. This allows the device 104 to periodically determine whether the position of the device 104 has changed such that the configuration of the device 104 should be updated. In some implementations, operation 846 delays commencement of an addition iteration of the process 840 until a condition is met, such as the passage of a predetermined length of time.

Figure 9:
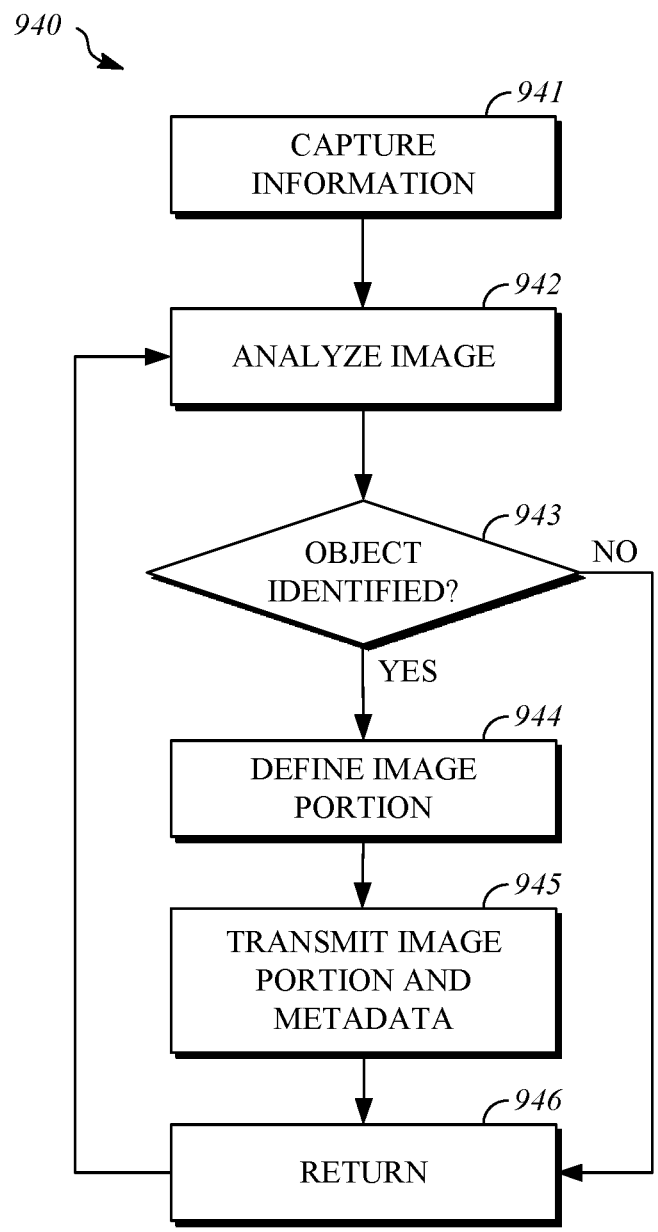
FIG. 9 is a flowchart that shows an example of a process for information capture and analysis.

FIG. 9 is a flowchart that shows an example of a process 940 for information capture and analysis. The process 940 can be performed using the distributed devices 102 and, optionally, the mapping system 100, with the description herein being made with respect to the device 104 being located in the vehicle 320. The process 940 can, however, be implemented using other configurations. The process 940 can, for example, be included in the process 540.

Operation 941 includes capturing information, and can be performed by the device 104. The device 104 may be located in a mobile apparatus such as the vehicle 320. The information captured in operation 541 can include an image that is obtained, for example, by the camera 214 of the device 104. The information captured in operation 541 can also include metadata. The metadata is captured at or around the time that the image is captured. The metadata can be information that is obtained from any source that is associated with the device 104, such as the sensors 216. The image and the metadata are consistent with the descriptions of images and metadata in previous examples.

Operation 942 includes analyzing the image. The purpose of analysis performed in operation 942 is to identify presence, in the image, of one or more objects of interest that may be useful for updating mapping information at the mapping system 100. The image corresponds to the field of view 324 of the camera 214, and may include a view of a large portion of the environment around the vehicle 320. One or more of the objects of interest may be present within the field of view 324 of the camera 214, but the location of these objects is not known to the device 104 prior to analysis in operation 942.

Analyzing the image in operation 942 can include a preprocessing step that excludes portions of the image from analysis. The step reduces the processing burden for analysis of the image, thereby conserving power and reducing heat generation. For example, parts of the image (for example, depicting interior surfaces of the vehicle 320) can be previously designated for exclusion by manually drawing boundaries that define the excluded material or by feature analysis that defines the excluded material. In implementations in which the orientation of the camera 214 is fixed relative to the vehicle 320, this need only be done after the device 104 is initially positioned relative to the vehicle 320, or after the position of the device 104 relative to the vehicle 320 changes.

Analyzing the image in operation 942 may be performed using a trained machine learning algorithm. The trained machine learning algorithm can be previously trained using images depicting the objects of interest in similar environments, annotated with information (e.g., bounding boxes showing locations in the image along with descriptive metadata) that is usable by a training module as ground truth information. The output of operation 942 is information indicating the locations of objects of interest (if any) in the image, and optionally metadata describing, for example, the type of object identified and/or other information.

In operation 943, a determination is made as to whether any object of interest were identified in operation 942. If one or more objects of interest were identified in operation 942, the process 940 continues to operation 944. If no objects of interest were identified in operation 942, the process proceeds to operation 946.

In operation 944, the device defines image portions from the image obtained in operation 941. The image portions are defined based on the detection of objects of interest in operation 942. For example, the image portions can be cropped so that each includes the object of interest without significant additional material from the original material. Cropping can be performed using bounding boxes defined in operation 943 as extents to crop the image portions to. By defining image portions, the amount of information to be stored and later transmitted to the mapping system 100 is reduced.

Operation 945 includes transmitting the image portions and their associated metadata from the device 104 to the mapping system 100. In addition to including sensor information, the metadata can also indicate the position at which the image portion was located at the original image, which can be used as a basis for estimating the location of the object represented in the image portion relative to the camera 214 of the device 104. The transmission can be performed using the communications device 212 of the device 104, such as by wireless data transmission using a cellular data network.

In operation 946, flow of the process 940 is returned to operation 941 and additional iterations of the process 940 are performed. In some implementations, operation 946 delays commencement of an addition iteration of the process 940 until a condition is met, such as the passage of a predetermined length of time, for example, the capture interval determined in process 640.

Figure 10:
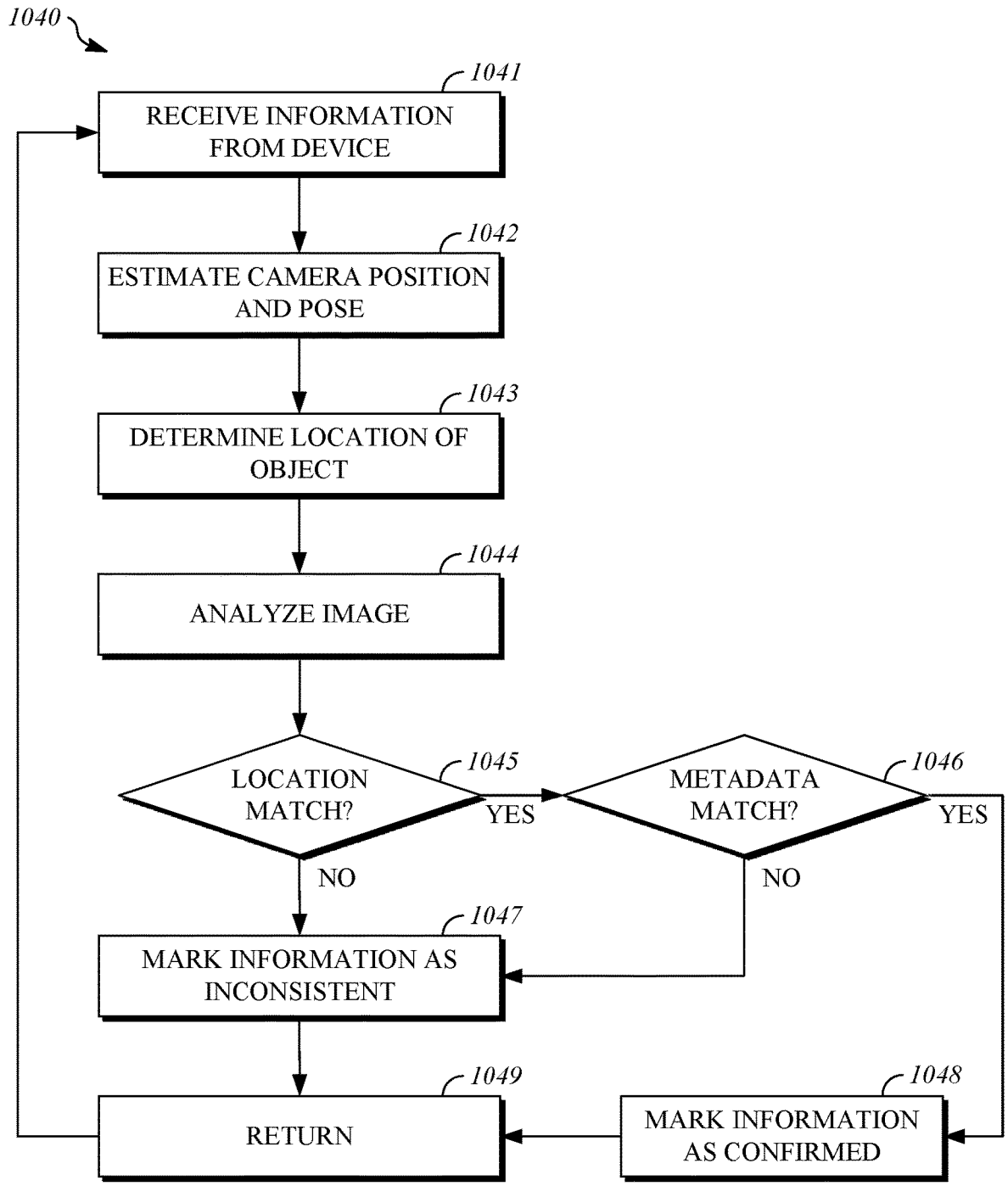
FIG. 10 is a flowchart that shows an example of a process for analysis of information at a mapping system.

FIG. 10 is a flowchart that shows an example of a process 1040 for analysis of information at the mapping system 100 or at the distributed devices 102, and will be described herein as being performed at the mapping system 100. The process 1040 can be performed using the mapping system 100 and the distributed devices 102, with the description herein being made with respect to the device 104 being located in the vehicle 320. The process 1040 can, however, be implemented using other configurations. The process 1040 can, for example, be included in the process 540.

In operation 1041, information is received by the mapping system 100 from the device 104. The information that is received by the mapping system 100 can include an image, an image portion, and/or metadata, as previously described. The metadata can include information describing an object of interest, including, for example a position of the object of interest in a full-frame image captured by the device and a classification for the object of interest that was determined by the device using an analysis model.

In operation 1042, the camera position and pose is estimated for the camera 214 of the device 104. The position of the camera 214 can be determined using information reported by the device in operation 1041, such as metadata indicating the position (e.g., in geographic coordinates) of the device 104 at the time the image was captured. The camera pose can be determined based on the heading reported by the device 104 in metadata associated with the image, in combination with an estimated angular relationship of the optical axis of the camera 214 relative to the heading. As an example, estimating the angular relationship of the optical axis of the camera 214 relative to the heading can be performed over multiple iterations of the process 1040, by comparing observed locations of objects with expected locations based on the mapping information in the map data store 423, and using geometric techniques to determine the camera pose for each observation that would place the object at the expected location.

In operation 1043, the information that was received from the device 104 in operation 1041 and the estimated camera position and pose from operation 1042 are analyzed at the mapping system 100 to determine the location of the object. Information that can be used to determine the position of the object relative to the camera 214 of the device 104 include known optical characteristics of the camera (e.g., angle of view), the position of the object within the full-frame image captured by the camera 214, the size of the object in the image, and the positional relationship of the object to other identifiable features in the image. This determination can be performed using geometric techniques, machine vision techniques, and/or machine learning techniques. If an image portion is being analyzed, the metadata includes information specifying the location of the image portion within the full-frame image that was captured by the camera 214 of the device 104. After the position of the object relative to the device 104 is determined, the estimated position and pose for the camera 214 of the device 104 is utilized to determine the position of the object in the coordinate space used for the mapping information.

In operation 1044, the image obtained in operation 1041 and its associated metadata are analyzed to identify and classify the objects and/or other features in the image. For example, the image and metadata can be analyzed using a trained machine learning model to identify an object depicted in an image or image portion. The analysis of operation 1044 can be performed in the manner described with respect to operation 543 of the process 540, and can include locating and/or identifying objects in images or image portions.

In operation 1045, a determination is made as to whether the location of the object of interest from the information received in operation 1041 matches the location of any objects in the mapping information of the map data store 423. In operation 1046 a determination is made as to whether the metadata associated with the object of interest from the information received in operation 1041 matches is consistent with metadata for known objects located at the location determined for the object of interest. For example, a location match may be made in operation 1045 for a traffic sign observed in the image captured by the device 104, but the comparison in operation 1046 may indicate that the type or size of traffic sign at this location differs between the observation and the stored mapping information. This type of inconsistency can indicate that conditions in this area have changed as a result of routing road maintenance operations or as a result of a major construction project. As another example, an inconsistency can be identified when the stored mapping information indicates that an object should be present, but no object is observed.

Operation 1047 is performed after determining that there is an inconsistency between the object of interest from the information received in operation 1041 and the objects represented in the mapping information of the map data store 423, based on the determination made in operation 1044 or the determination made in operation 1045. The received information is marked as inconsistent in operation 1047 by adding information to the map data store that indicates the inconsistency. This can be done, for example, by annotating the mapping information, adding an entry to a review log, setting a flag indicative of the inconsistency, or in any other manner. This information can be stored for further processing by the data manager 434 of the mapping system 100, and used as a basis for updating the mapping information or requesting additional data collection to determine whether and how to update the mapping information. Optionally, in response to marking information as inconsistent, the mapping system 100 can request additional information from the device 104, such as by requesting transmission of a full frame image if only an image portion was sent previously for a particular object.

Operation 1048 is performed after determining that there is no inconsistency between the object of interest from the information received in operation 1041 and the objects represented in the mapping information of the map data store 423, based on the determinations made in operation 1044 and operation 1045. The information is marked as consistent, which can be reflecting in the mapping data for the object and saved in the map data store 423.

Subsequent to operation 1047 or operation 1048, the process 1040 proceeds to operation 1049, in which the flow of the process is returned to operation 1041. In some implementations, operation 648 delays commencement of an addition iteration of the process 640 until a condition is met, such as the receipt of new information from the device 104.

Figure 11:
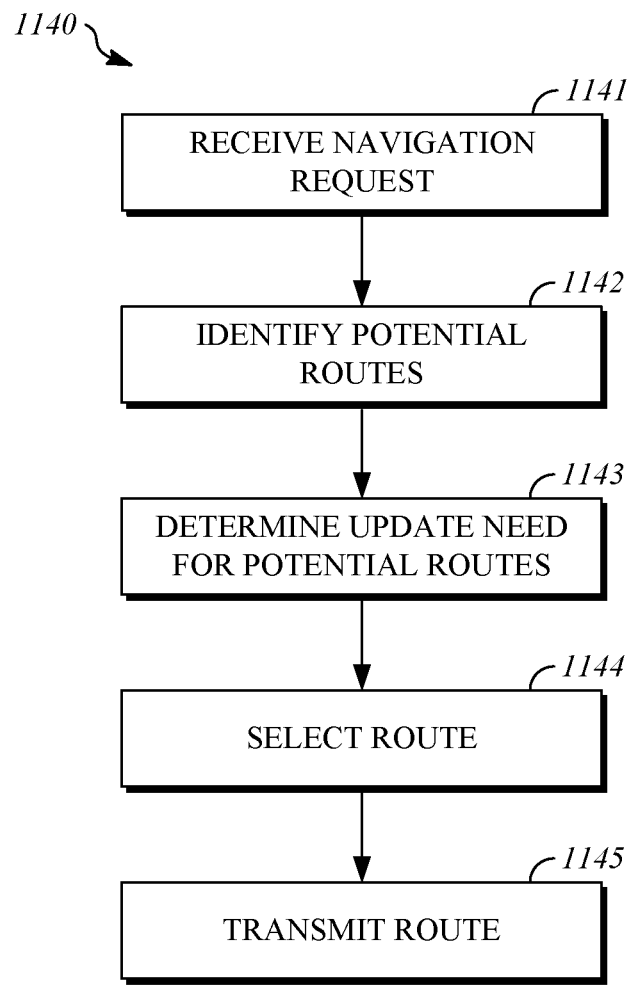
FIG. 11 is a flowchart that shows an example of a process for updating information.

FIG. 11 is a flowchart that shows an example of a process 1140 for updating information. The process 1140 can be performed using the mapping system 100 and the distributed devices 102, with the description herein being made with respect to the device 104 being located in the vehicle 320. The process 1140 can, however, be implemented using other configurations. The process 1140 can, for example, be included in the process 540.

In operation 1141, a navigation request is received from the device 104 or from another system present in the vehicle 320 having the device 104. For example, the navigation request can specify a starting point and an ending point.

In operation 1142, potential routes are identified for navigation between the starting point and the ending point. Identification of navigation routes is performed by the navigation service 432 of the mapping system 100, and can be performed in a conventional manner.

In operation 1143, the data manager 434 determines whether updated information is needed for any of the potential routes. As one example, one of the routes may have been previously selected for updating. As another example, a score can be generated for each of the potential routes, where the score is indicative of a degree of need for an update for each of the potential routes.

In operation 1144, a route is selected for use based in part on the determination made in operation 1143. As an example, scores generated in operation 1143 can be used to select the route. As another example, the scores generated in operation 1143 can be used as factors in a factor-based selection between the potential routes.

In operation 1145, the route is transmitted from the mapping system 100 to the device 104 and/or other system associated with the vehicle 320. The route can then be used to operate the vehicle 320 between the starting point and the ending point, under manual or autonomous control, while the device 104 obtains information including images and metadata as previously described.

In another implementation of the process 1140, the navigation route can be selected without receiving a navigation request from the device 104 or an associated system of the vehicle 320. This can be done using a starting point, ending point, and route between the starting and ending points that is selected solely based on the need for an update to the information, which effectively dispatches that vehicle 320 that includes the device 104 to obtain information for a given area.

What is claimed is:

1. A method, comprising:
   capturing images at a device;
   analyzing the images at the device using a first analysis model to obtain information regarding an observed object;
   determining whether the information regarding the observed object is consistent with stored mapping information by determining whether metadata associated with the observed object is consistent with the stored mapping information; and
   in response to determining that the information regarding the observed object is not consistent with the stored mapping information, modifying the stored mapping information based on the observed object.

2. The method of claim 1, wherein modifying the stored mapping information based on the observed object includes updating the stored mapping information to include the information regarding the observed object.

3. The method of claim 1, wherein modifying the stored mapping information based on the observed object includes updating the stored mapping information to include information indicating an inconsistency in the stored mapping information, and the information indicating the inconsistency is used to determine whether to collect additional information in an area.

4. The method of claim 1, wherein determining whether the information regarding the observed object is consistent with stored mapping information includes:
   estimating a camera position and pose for a camera that is associated with the device,
   estimating a location of the observed object relative to the camera, and
   determining whether the location of the observed object is consistent with the stored mapping information.

5. The method of claim 1, further comprising:
   transmitting the information regarding the observed object to a mapping system, wherein transmitting the information regarding the observed object to the mapping system includes defining an image portion that depicts the observed object.

6. The method of claim 1, further comprising:
   transmitting information regarding the observed object to a mapping system, wherein determining whether the information regarding the observed object is consistent with stored mapping information is performed at the mapping system using a second analysis model; and
   analyzing the information regarding the observed object at the mapping system to determine a classification for the observed object.

7. A method, comprising:
   capturing images at a device;
   analyzing the images at the device using a first analysis model to obtain information regarding an observed object, wherein the first analysis model is selected from a group of two or more analysis models based on a location of the device;
   determining whether the information regarding the observed object is consistent with stored mapping information; and
   in response to determining that the information regarding the observed object is not consistent with the stored mapping information, modifying the stored mapping information based on the observed object.

8. The method of claim 7, further comprising:
   transmitting information regarding the observed object to a mapping system, wherein determining whether the information regarding the observed object is consistent with stored mapping information is performed at the mapping system using a second analysis model; and
   analyzing the information regarding the observed object at the mapping system to determine a classification for the observed object.

9. A non-transitory computer-readable storage device including program instructions that are executable by one or more processors that, when executed, cause the one or more processors to perform operations, the operations comprising:
- capturing images at a device;
- analyzing the images at the device using a first analysis model to obtain information regarding an observed object;
- determining whether the information regarding the observed object is consistent with stored mapping information by determining whether metadata associated with the observed object is consistent with the stored mapping information; and
- in response to determining that the information regarding the observed object is not consistent with the stored mapping information, modifying the stored mapping information based on the observed object.

10. The non-transitory computer-readable storage device of claim 9, wherein modifying the stored mapping information based on the observed object includes updating the stored mapping information to include the information regarding the observed object.

11. The non-transitory computer-readable storage device of claim 9, wherein modifying the stored mapping information based on the observed object includes updating the stored mapping information to include information indicating an inconsistency in the stored mapping information, and the information indicating the inconsistency is used to determine whether to collect additional information in an area.

12. The non-transitory computer-readable storage device of claim 9, wherein determining whether the information regarding the observed object is consistent with stored mapping information includes:
- estimating a camera position and pose for a camera that is associated with the device,
- estimating a location of the observed object relative to the camera, and
- determining whether the location of the observed object is consistent with the stored mapping information.

13. The non-transitory computer-readable storage device of claim 9, further comprising:
- transmitting the information regarding the observed object to a mapping system, wherein transmitting the information regarding the observed object to the mapping system includes defining an image portion that depicts the observed object.

14. The non-transitory computer-readable storage device of claim 9, further comprising:
- transmitting information regarding the observed object to a mapping system, wherein determining whether the information regarding the observed object is consistent with stored mapping information is performed at the mapping system using a second analysis model; and
- analyzing the information regarding the observed object at the mapping system to determine a classification for the observed object.

15. A non-transitory computer-readable storage device including program instructions that are executable by one or more processors that, when executed, cause the one or more processors to perform operations, the operations comprising:
- capturing images at a device;
- analyzing the images at the device using a first analysis model to obtain information regarding an observed object, wherein the first analysis model is selected from a group of two or more analysis models based on a location of the device;
- determining whether the information regarding the observed object is consistent with stored mapping information; and
- in response to determining that the information regarding the observed object is not consistent with the stored mapping information, modifying the stored mapping information based on the observed object.

16. The non-transitory computer-readable storage device of claim 15, further comprising:
- transmitting information regarding the observed object to a mapping system, wherein determining whether the information regarding the observed object is consistent with stored mapping information is performed at the mapping system using a second analysis model; and
- analyzing the information regarding the observed object at the mapping system to determine a classification for the observed object.

17. A method, comprising:
- capturing an image at a device;
- determining, by the device using a first analysis model, that the image includes an observed object;
- in response to determining the image includes the observed object, transmitting at least an image portion from the image to a mapping system;
- determining, by the mapping system, that the observed object is not consistent with stored mapping data; and
- in response to determining that the observed object is not consistent with the stored mapping data, requesting, by the mapping system, a full-frame version of the image.

18. The method of claim 17, further comprising:
- in response to determining that the observed object is not consistent with the stored mapping data, updating, by the mapping system, the stored mapping data based on the observed object.

19. The method of claim 17, further comprising:
- determining, by the mapping system using a second analysis model, a classification for the observed object.

20. A non-transitory computer-readable storage device including program instructions that are executable by one or more processors that, when executed, cause the one or more processors to perform operations, the operations comprising:
- capturing an image at a device;
- determining, by the device using a first analysis model, that the image includes an observed object;
- in response to determining the image includes the observed object, transmitting at least an image portion from the image to a mapping system;
- determining, by the mapping system, that the observed object is not consistent with stored mapping data; and
- in response to determining that the observed object is not consistent with the stored mapping data, requesting, by the mapping system, a full-frame version of the image.

21. The non-transitory computer-readable storage device of claim 20, further comprising:
- in response to determining that the observed object is not consistent with the stored mapping data, updating, by the mapping system, the stored mapping data based on the observed object.

22. The non-transitory computer-readable storage device of claim 20, further comprising:
- determining, by the mapping system using a second analysis model, a classification for the observed object.

* * * * *